United States Patent [19]

Trop

[11] Patent Number: 4,877,458

[45] Date of Patent: Oct. 31, 1989

[54] CONTINUOUS AUTOMATIC SNOW AND ICE PREVENTION AND CLEARING OF AUTOMOBILE FRONT AND REAR WINDOWS

[75] Inventor: Moshe Trop, Brooklyn, N.Y.

[73] Assignee: Morton Weintraub, Brooklyn, N.Y.

[21] Appl. No.: 126,469

[22] Filed: Nov. 30, 1987

[51] Int. Cl.$^4$ ............................................. B08B 7/04
[52] U.S. Cl. ..................................... 134/5; 134/22.16; 134/40
[58] Field of Search ........................ 134/40, 22.16, 5; 52/171, 172

[56] References Cited

U.S. PATENT DOCUMENTS

| | | | |
|---|---|---|---|
| 3,537,894 | 11/1970 | Thompson | 134/22.16 |
| 4,512,907 | 4/1985 | McConnell | 252/70 |
| 4,597,884 | 7/1986 | Greenwald | 252/70 |
| 4,654,157 | 3/1987 | Fukunaga | 252/70 |
| 4,711,257 | 12/1987 | Kobayashi | 134/45 |

*Primary Examiner*—Asok Pal

[57] ABSTRACT

The present application relates to the means and method for controlling automatically the quantity of snow falling upon automobile (herein defined as a vehicle carrying an engine by which it is propelled) front and rear windows thus blocking clear vision thereof and requiring clearing; and for automatically preventing ice from forming on automobile front and rear windows thus blocking clear vision thereof and requiring clearing. The apparatus and method providing an operator of the automobile with continuous clear vision without the effort of clearing falling snow and forming ice from the front and rear windows when he enters his automobile after it was parked while present snow and ice clearing mechanisms were not in operation.

25 Claims, 1 Drawing Sheet

CONTINUOUS AUTOMATIC SNOW AND ICE PREVENTION AND CLEARING OF AUTOMOBILE FRONT AND REAR WINDOWS

BACKGROUND OF THE INVENTION

The problems pertaining to the mechanism for clearing snow and ice of the prior state of the art are as follows:

(1) Snow falling overnight or when an automobile is parked for long periods and ice forming below the snow could not be cleared from front and rear automobile windows without (a) great exertion and (b) loss of time.

(2) Prior art provided no inexpensive automatic method and apparatus for automatically preventing ice from froming and snow from blocking front and rear automobile windows while the automobile was parked and while the automobile was operating through traffic.

(3) Prior art provided no inexpensive automatic method for preventing formation of ice and snow blocking the vision via front and rear automobile windows when existing mechanism for achieving same fails.

Accordingly, a first objective of the invention is to provide a means and method for automatically controlling the quantity of snow falling upon front and rear windows thus blocking clear vision thereof and requiring clearing.

Another objective of the invention is to provide a means and method for automatically preventing ice from forming on automobile front and rear windows thus blocking clear vision thereof and requiring clearing.

Another objective of the invention is to provide an apparatus and method providing an operator of an automobile with continuous clear vision without the effort of clearing falling snow and forming ice from the front and rear windows when he enters his automobile after it was parked while present snow and ice clearing mechanisms were not in operation.

Another objective of the invention is to provide an inexpensive automatic method for preventing the forming of ice and snow blocking the vision via front and rear automobile windows when existing mechanism for achieving same fails while the automobile is in operation thereby preventing accidents.

Other objectives will become apparent during the course of this disclosure.

BRIEF DESCRIPTION OF THE DRAWINGS

FIG. 1 also illustrates the rear automobile window and thereon a plurality of containers 1 containing a quantity of solid hygroscopic material 4, which may include sugars.

DETAILED DESCRIPTION OF THE DRAWINGS

Among the underlying principles of operation of the innovative apparatus is as follows: When hygroscopic material 4 such as calcium chloride, calcium sulfate, magnesium chloride, aluminium chloride, sodium chloride, and ammonium chloride comes into contact with snow, the snow melts and thus wets the hygroscopic material 4. A potion of the hygroscopic material 4 is dissolved in the melted snow which is now water that is allowed to seep through a special container 1 so constructed for allowing such seepage. The seepage moves down the outer surface area of the front and rear windows 2 thereby melting the snow and any ice forming thereon.

Figure 1:
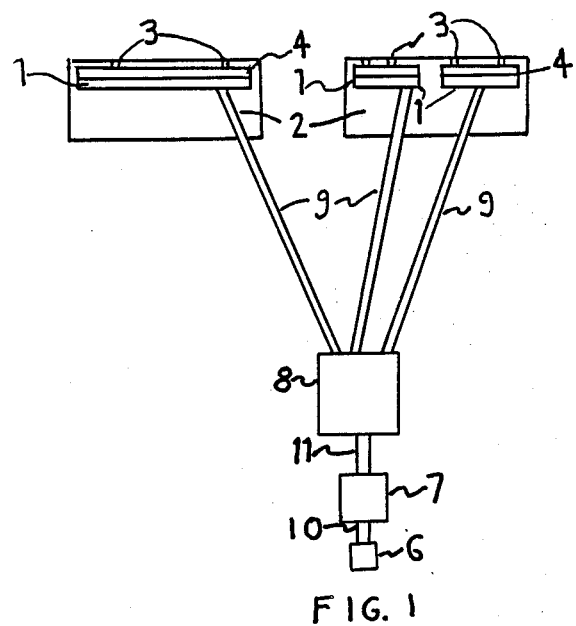
FIG. 1 is a drawing of the front automobile window (windshield) and thereon a container 1 containing a quantity of granular hygroscopic material 4. Also shown in FIG. 1 is a foot or electric pump device for pumping a quantity of water from a water reservoir or storage tank (normally located under the hood) 8 for increasing the wetting process of the hygroscopic material 4 thereby providing a faster "drip" of the hygroscopic material-water mix (and if desired a small quantity of detergent may also be inserted therein) at a rate in a relationship in accordance with the rate of pumping of the mix upon the front and/or rear window. The pumping device may be specifically made for this purpose or one or more hoses connecting one or more containers 1 to the existing "window washer" pumping device already contained in most automobiles for washing the front window of automobile while using the winshield washer already contained within the storage tank for same. Also, because most commerical window washer fluid already contains a quantity of detergent or other chemical prepared for use in cleaning windows, the window washer fluid pumped via the existing window washer pump onto container 1 containing the hygroscopic material 4 will result in a water-hygroscopic material-detergent or soap mix thereby preventing snow and ice from forming while simultaneously cleaning the front and rear window when a second hose 9 carries the pumped water-hygroscopic material-detergent mix to the rear window of the automobile. Urea may also be included in container 1 operating independently and in conjunction with hygroscopic material for preventing snow and ice from forming while simultaneously clearing the front and rear windows.

FIG. 1 illustrates how container 1 is attached to the automobile via attaching means 3 which may be simple hooks or glued tape or "velcro" or other means for attaching both container 1 and the front and rear window 2 and/or window frames (not shown) to each other such that container 1 containing the hygroscopic material 4 lays upon the front and rear window of the automobile in a position providing for seepage and contact of falling snow upon the hygroscopic material 4 and for seepage of the dissolved material upon the window surface. In providing the function described above container 1 may be made of pourus material (which may be paper, cloth or wood not shown) for providing a housing for the hygroscopic material 4 similar to the housing provided by the pourus paper material providing a housing for tea. Like tea bags container 1 may be so constructed so as to be disposable after use since both the hygroscopic material 4 and the porous material comprising container 1 are very inexpensive. Container 1 of FIG. 2 in providing the identical purpose described above may be constructed such that it is open wider at the top portion thereof and having perforations 5 at the bottom for allowing seepage of the dissolved hygroscopic material-water mixture upon window 2.

Figure 2:
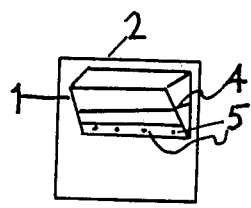
FIG. 2 is a drawing of container 1 such that container 1 extends outward at its upper portion while narrowing at the bottom where the perforations 5 for releasing the hygroscopic material-water mix upon the auto window 2 formed as a result of falling on 4 via the top of container 1 and/or formed as a result of pumped water when peddle 6 activates pump 7 via connecting means 10 thereby pumping the liquid to container(s) 1 via connecting means 11 connecting pump 7 to reservoir 8 onto hose(s) 9 into container 1 as shown in FIG. 1.
Figure 3:
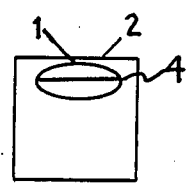
FIG. 3 is a drawing of container 1 comprising porous material housing the granular hygroscopic material 4 like the porous material housing tea of a tea bag of other porous material whereby providing for falling snow to contact material 4 and liquid froming as a result of the contact seeping out via the porous material of container 1 upon window 2 melting any snow or ice having contact with the liquid. Also liquid may simultaneously and independently be pumped upon hygroscopic material 4 as a result of pumped water when peddle 6 activates pump 7 via connecting means 10 thereby pumping the liquid to container(s) 1 via connecting means 11 connecting pump 7 to reservoir 8 onto hose(s) 9 into container 1 as shown in FIG. 1.

The wider top portion of container 1 shown in FIG. 2 providing for a greater collection of falling snow flakes so as to provide faster dissolving of the hygroscopic material 4 loosely contained therein or packaged in the porous material in a packet. FIG. 1 also illustrates how a plurality of containers 1 may be attached to the rear window and/or to the front window of the automobile.

The pump mechanism shown in FIG. 1 functions as follows: When an increased rate of seepage from container 1 onto window 2 is desired such as during a snow storm and the like, the operator of the automobile simply pushes down on peddle (or knob) 6 thereby activating pump 7 to drive water from reservoir 8 through hose(s) 9 onto the hygroscopic material 4 contained in container 1 at a rate in a relationship in accordance with the rate of pumping, thus wetting hygroscopic material 4 sufficiently so as to provide a greater quantity of the water-hygroscopic material 4 mixture seeping down upon the surface of window 2 in a relationship in accordance with the rate of pumping.

Understandably, an automatic pump 7 identical to those already located in many automobiles having means for controlling the speed or rate of pumping (not shown) may be employed for providing automatic pumping via hose 9. Hence, the pump mechanism shown in FIG. 1 may comprise a window washing mechanism already existing in most cars having additional hoses 9 leading from a water tank or reservoir 8 or a window washing commercially available fluid reservoir 8 located below the hood of the automobile, to container 1 such that when pump 7 is pumped it forces the water or window washing fluid or a detergent liquid via hose 9 to hygroscopic material 4 at a rate in a relationship in accordance with the rate of pumping onto front and/or rear window 2.

We claim:

1. A method for clearing an accumulation of snow and ice upon a window of an automobile when said automobile is in operation and when said automobile is not in operation, the steps comprising, attaching to said automobile in proximity of said window a container having means for allowing contact of said falling snow and ice with solid hygroscopic material contained in said container such that when said snow and said ice comes into said contact with said hygroscopic material, said snow and ice dissolves a quantity of said hygroscopic material, said dissolved material flows onto said window via means for allowing said flow of said material comprising a solution of said hygroscopic material and melted said snow and ice, thereby providing said clearing of said accumulation in accordance with said flow by melting said accumulation of snow and ice when said automobile is in operation and when said automobile is not in operation.

2. A method of claim 1 wherein said hygroscopic material comprising a plurality of the following group: calcium chloride, calcium sulfate, magnesium chloride, sugar, sodium chloride, ammonium chloride, urea.

3. A method of claim 1 wherein said hygroscopic material comprising urea.

4. A method of claim 1 wherein said means for allowing said flow comprising a plurality of perforations.

5. A method of claim 1 wherein said hygroscopic material comprising any one of the following group: calcium chloride, calcium sulfate, magnesium chloride, sugar, sodium chloride, ammonium chloride.

6. A method for clearing an accumulation of snow and ice upon a window of an automobile, the steps comprising, attaching to said automobile in proximity of said window a container having means for allowing contact of said falling snow and ice with solid hygroscopic material contained in said container such that when said snow and said ice comes into said contact with said hygroscopic material, said snow and ice dissolves a quantity of said hygroscopic material, said dissolved material flows onto said window via means for allowing said flow of said material comprising a solution of said hygroscopic material and melted said snow and ice, pumping liquid pumping means for providing a quantity of said liquid flowing onto said hygroscopic material in a relationship in accordance with a rate of said pumping, said liquid advancing said dissolving of said hygroscopic material in accordance with said rate of pumping, said liquid comprising said dissolved hygroscopic material flows onto said window via said means for allowing said flow, thereby providing said clearing by melting of said accumulation of snow and ice in accordance with said flow.

7. A method of claim 6 wherein said hygroscopic material comprising a plurality of the following group: calcium chloride, calcium sulfate, magnesium chloride, sugar, sodium chloride, ammonium chloride, urea.

8. A method of claim 6 wherein said hygroscopic material comprising urea.

9. A method of claim 6 wherein said means for allowing said flow comprising a plurality of perforations.

10. A method of claim 6 wherein said liquid pumping means comprising a liquid pumping means already installed in said automobile.

11. A method of claim 10 wherein said liquid comprising window washing fluid.

12. A method of claim 6 wherein said hygroscopic material comprising any one of the following group: calcium chloride, calcium sulfate, magnesium chloride, sugar, sodium chloride, ammonium chloride, urea.

13. A method for preventing an accumulation of falling snow and ice upon a window of an automobile, when said automobile is in operation and when said automobile is not in operation, the steps comprising, attaching to said automobile in proximity of said window a container having means for allowing contact of said of falling snow and ice with solid hygroscopic material contained in said container such that when said snow and said ice comes into said contact with said hygroscopic material, said snow and ice dissolves a quantity of said hygroscopic material, said dissolved material flows onto said window via means for allowing said flow of said material comprising a solution of said hygroscopic material and melted said snow and ice, thereby providing said preventing of said accumulation of said ice and snow by melting said ice and snow in accordance with said flow when said automobile is in operation and when said automobile is not in operation.

14. A method of claim 13 wherein said hygroscopic material comprising a plurality of the following group: calcium chloride, calcium sulfate, magnesium chloride, sugar, sodium chloride, ammonium chloride, urea.

15. A method of claim 13 wherein said hygroscopic material comprising urea.

16. A method of claim 13 wherein said container containing a plurality of perforations of said container for allowing said flow onto said window.

17. A method of claim 13 wherein said hygroscopic material comprising any one of the following group: calcium chloride, calcium sulfate, magnesium chloride, sugar, sodium chloride, ammonium chloride, urea.

18. A method for preventing an accumulation of falling snow and ice upon a window of an automobile, the steps comprising, attaching to said automobile in proximity said window a container having means for allowing contact of said falling snow and ice with solid hygroscopic material contained in said container such that when said snow and said ice comes into said contact with said hygroscopic material, said snow and ice dissolves a quantity of said hygroscopic material, said dissolved material flows onto said window via means for allowing said flow of said material comprising a solution of said hygroscopic material and melted said snow and ice, pumping liquid pumping means for providing a quantity of said liquid flowing onto said hygroscopic material in a relationship in accordance with a rate of said pumping, said liquid advancing said dissolving of said hygroscopic material in accordance with said rate of pumping, said liquid comprising said dissolved hygroscopic material flows onto said window via said means for allowing said flow, thereby providing said preventing of said accumulation of ice and snow by melting of said ice and snow in accordance with said flow.

19. A method of claim 18 wherein said hygroscopic material comprising a plurality of the following group: calcium chloride, calcium sulfate, magnesium chloride, sugar, sodium chloride, ammonium chloride, urea.

20. A method of claim 18 wherein said hygroscopic material comprising urea.

21. A method of claim 18 wherein said means of passage comprising a plurality of perforations of said container for allowing said flow onto said window.

22. A method of claim 18 wherein said liquid pumping means comprising a liquid pumping means already installed in said automobile.

23. A method of claim 22 wherein said liquid comprising window washing fluid.

24. A method of claim 18 wherein said hygroscopic material comprising any one of the following group: calcium chloride, calcium sulfate, magnesium chloride, sugar, sodium chloride, ammonium chloride urea.

25. A method for simultaneously and independently preventing falling snow and ice form accumulating upon a window of an automobile and clearing an accumulation of snow and ice already accumulated upon said window of said automobile, the steps comprising, attaching to said automobile in proximity of said window a container having means for allowing contact of said falling snow and ice with solid hygroscopic material contained in said container such that when said snow and said ice comes into said contact with said hygroscopic material, said snow and ice dissolves a quantity of said hygroscopic material, said dissolved material flows onto said window via means for allowing said flow of said material comprising a solution of said hygroscopic material and melted said snow and ice, thereby providing said preventing and said clearing of said accumulation of ice and snow by melting of said ice and snow in accordance with said flow, pumping liquid pumping means for providing a quantity of said liquid flowing onto said hygroscopic material in a relationship in accordance with a rate of said pumping, said liquid advancing said dissolving of said hygroscopic material in accordance with said rate of pumping, said liquid comprising said dissolved hygroscopic material flows onto said window via said means for allowing said flow, thereby providing said preventing and said clearing of said accumulation of said ice and snow by melting said ice and said snow in accordance with said flow.

* * * * *